US009742061B2

(12) United States Patent
Knight

(10) Patent No.: US 9,742,061 B2
(45) Date of Patent: Aug. 22, 2017

(54) SWIVEL MOUNTED ANTENNA

(71) Applicant: The United States of America as represented by the Secretary of the Navy, Washington, DC (US)

(72) Inventor: Barry W. Knight, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 199 days.

(21) Appl. No.: 14/569,594

(22) Filed: Dec. 12, 2014

(65) Prior Publication Data

US 2015/0255866 A1 Sep. 10, 2015

Related U.S. Application Data

(60) Provisional application No. 61/947,768, filed on Mar. 4, 2014.

(51) Int. Cl.

*F16M 11/00* (2006.01)
*H01Q 3/08* (2006.01)
*H01Q 1/12* (2006.01)
*H01Q 19/30* (2006.01)
*H01Q 1/32* (2006.01)

(52) U.S. Cl.

CPC ................. *H01Q 3/08* (2013.01); *H01Q 1/12* (2013.01); *H01Q 19/30* (2013.01); *H01Q 1/3275* (2013.01); *Y10T 29/49826* (2015.01)

(58) Field of Classification Search

CPC combination set(s) only.
See application file for complete search history.

(56) References Cited

U.S. PATENT DOCUMENTS 3,886,560 A 5/1975 Mortensen et al.
3,945,015 A 3/1976 Gueguen
4,103,305 A * 7/1978 Gualano .............. H01Q 1/1207 343/715
4,115,779 A * 9/1978 Dantzler .............. H01Q 1/1214 343/715
4,190,839 A 2/1980 Liautaud
4,207,574 A 6/1980 Toia
4,242,684 A 12/1980 Wolverton
4,249,182 A 2/1981 Rupley
4,266,227 A 5/1981 Blaese
4,538,155 A * 8/1985 Stewart .................... H01Q 1/10 343/715

(Continued)

OTHER PUBLICATIONS

Winegard, Portable Satellite Antenna Mounts; www.winegard.com/mounts/index.php; Aug. 29, 2014; 2 pages.

(Continued)

*Primary Examiner* — Monica Millner
(74) *Attorney, Agent, or Firm* — Christopher A. Monsey

(57) ABSTRACT

A swivel mount apparatus and method for installing a swivel mount apparatus on a vehicle. The swivel mount apparatus includes a first member, a second member rotatably coupled to the first member, and a mounting post affixed to the first member and extending upwardly relative to the first member, wherein the mounting post receives the second member. A receiving space is defined by the second member and receives an accessory, such that the accessory may be adjusted relative to the vehicle.

31 Claims, 8 Drawing Sheets

(56) References Cited

U.S. PATENT DOCUMENTS

| | | | | | |
|---|---|---|---|---|---|
| 4,546,949 | A * | 10/1985 | Millett | H01Q 1/1228 | 248/230.1 |
| 4,663,633 | A * | 5/1987 | Wilson | H01Q 1/084 | 343/714 |
| 4,725,843 | A * | 2/1988 | Suzuki | H01Q 1/3275 | 318/649 |
| 5,248,986 | A * | 9/1993 | Marshall | H01Q 1/084 | 343/715 |
| 5,252,985 | A * | 10/1993 | Christinsin | H01Q 1/084 | 343/715 |
| 5,422,651 | A * | 6/1995 | Chang | H01Q 1/084 | 343/702 |
| 5,821,907 | A | 10/1998 | Zhu et al. | | |
| 6,348,899 | B1 | 2/2002 | Bergstein | | |
| 6,630,912 | B2 | 10/2003 | Ehrenberg et al. | | |
| 6,653,981 | B2 | 11/2003 | Wang et al. | | |
| 7,369,097 | B1 | 5/2008 | Sherwood | | |
| 7,397,435 | B2 * | 7/2008 | McEwan | H01Q 1/084 | 343/713 |
| 7,557,764 | B2 * | 7/2009 | Krajicek | H01Q 1/3275 | 343/713 |
| 7,631,455 | B2 | 12/2009 | Keng et al. | | |
| 8,106,660 | B1 | 1/2012 | Merewether et al. | | |
| 8,714,426 | B2 | 5/2014 | Bohurjak et al. | | |
| 2003/0083063 | A1 * | 5/2003 | Wang | H01Q 1/3275 | 455/427 |
| 2003/0107526 | A1 * | 6/2003 | Kleinschmidt | H01Q 1/1235 | 343/883 |
| 2004/0196207 | A1 | 10/2004 | Schefter et al. | | |
| 2006/0007048 | A1 * | 1/2006 | Forshey | H01Q 1/1207 | 343/880 |
| 2006/0132374 | A1 * | 6/2006 | Wang | H01Q 1/3275 | 343/770 |
| 2007/0247378 | A1 * | 10/2007 | Masterson | H01Q 1/1235 | 343/713 |
| 2008/0035806 | A1 * | 2/2008 | Sporay | B63B 49/00 | 248/161 |
| 2009/0267865 | A1 | 10/2009 | Miller et al. | | |

OTHER PUBLICATIONS

Ultralife Corporation; www.ultralifecorporaiion.com/commsys/products/adapters-and-accessories/av-2055-uhf-satellite-communication-satcom-antenna/ ; Dec. 31, 2014; 1 page.

* cited by examiner

SWIVEL MOUNTED ANTENNA

CROSS-REFERENCE TO RELATED APPLICATION

This application claims priority to U.S. Provisional Application Ser. No. 61/947,768, filed on Mar. 4, 2014, the disclosure of which is expressly incorporated herein by reference.

STATEMENT REGARDING FEDERALLY SPONSORED RESEARCH OR DEVELOPMENT

The invention described herein was made in the performance of official duties by an employee of the Department of the Navy and may be manufactured, used and licensed by or for the United States Government for any governmental purpose without payment of any royalties thereon. This invention (NC 103,080) is assigned to the United Stated Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE DISCLOSURE

The present invention relates to a swivel mounted (i.e., rotatable) antenna system that can be mounted on any mobile equipment item, such as a commercial motor vehicle (CMV) or government motor vehicle (GMV), and requires minimal tooling to mount or remove the swivel mount from the mobile equipment item. Due to the unique nature of the swivel mount, the antenna system can be adjusted manually by an operator positioned, illustratively seated, in the passenger compartment of a vehicle in order for the antenna to maintain alignment with an orbiting satellite to enable satellite communications (SATCOM).

A swivel-mounted antenna can be used to support the communications needs of various civilian and military personnel while they are deployed in support of operations occurring within or outside of the United States. A UHF (Ultra-High Frequency) SATCOM antenna mounted on a tripod can be removed from the tripod, and then mounted externally onto the hood of a vehicle via a mounting interface. The mounting interface should enable the antenna to be manually adjusted for altitude, and manually rotated within 360 degrees of azimuth in order to communicate with a satellite (via line of sight) as the satellite orbits the earth.

The combination of a ground supported tripod and a vehicle supported swivel mount apparatus would enable a SATCOM antenna to be used in a dual use capacity. The antenna could be mounted on a tripod that is stationary on the ground, and also could be quickly connected to or disconnected from the tripod depending on the operational need for the antenna. The dual use functionality would allow the antenna to be used while either attached to a tripod, or for mobile use while installed or mounted on a vehicle via a swivel mount apparatus.

Current mounting devices do not allow antennas to be easily installed on, or removed from a vehicle, while permitting operators to efficiently and conveniently manipulate the antenna in order to communicate with satellites while installed on the vehicle. Moreover, existing mounting devices typically require that the entire vehicle be physically moved (e.g., rotated) to enable line of sight communication between the antenna and an orbiting satellite. Accordingly, a need exists for an adjustable SATCOM antenna mounted on a mobile equipment item (such as a CMV or GMV) that can be rotated manually to acquire satellite reception without having to move the entire vehicle.

In an illustrative embodiment of the present disclosure, a swivel mount apparatus for coupling an antenna to a vehicle includes a first member configured to couple to a mounting interface on a vehicle, a second member rotatably coupled to the first member, and a mounting post affixed to the first member and extending upwardly relative to the first member. The mounting post receives the second member and causes the second member to be rotatably coupled to the first member, the mounting post defining an azimuth pivot axis extending perpendicular to the first member. An antenna includes an antenna post and antenna blades supported by the antenna post for pivoting movement about an elevational pivot axis extending perpendicular to the azimuth pivot axis. A coupler couples the antenna post to the second member. The second member illustratively includes a first receiving wall and a second receiving wall, and a receiving space defined by the first receiving wall and the second receiving wall, the antenna post being received within the receiving space. In an illustrative embodiment, a first angle member defines the first receiving wall and a second angle member defines the second receiving wall. Further illustratively, the second member includes a vertical wall, and the first angle member and the second angle member are affixed to the vertical wall of the second member. Illustratively, the second member supports the antenna for rotation about the azimuth pivot axis. The coupler illustratively includes at least one fastener received within at least one threaded hole in the second member, wherein the at least one fastener secures the antenna post to the second member. Illustratively, the first member includes a lower surface and an upper surface, and the post is inserted from the lower surface and extends upwardly relative to the upper surface. The first member illustratively includes a thru-hole configured to receive a fastener, wherein the fastener secures the first member to a pre-existing coupling point defined by the mounting interface of the vehicle. Illustratively, a first washer receives the mounting post and is disposed between the first member and the second member, and a second washer receives the post and is disposed atop the second member. A lock washer may be disposed atop the second washer and a wing nut may be disposed atop the lock washer, wherein the lock washer and the wing nut secure the second member in a desired rotational position relative to the first member about the azimuth axis.

In another illustrative embodiment of the present disclosure, a method of installing a swivel mount apparatus on a vehicle includes the steps of locating a pre-existing mounting interface on a vehicle, the mounting interface including a coupling point configured to secure a first member to the vehicle, mechanically coupling the first member to the coupling point on the mounting interface, and rotatably coupling a second member to the first member for rotation about an azimuth pivot axis. The method further includes the steps of installing at least one retaining member to couple the second member to the first member, and coupling an antenna post to the second member. The method further illustratively includes the steps of installing a first washer between the first member and the second member, and installing a second washer atop the second member. The step of installing at least one retaining member to couple the second member to the first member illustratively includes installing a lock washer atop the second washer, and installing a wing nut atop the lock washer. The vehicle illustratively includes a hood and a passenger compartment including a driver side and a passenger side, wherein the mounting interface is integral to the hood and is located longitudinally forward of the passenger compartment and laterally on the passenger side. Illustratively, the method further includes the steps of rotating the antenna about the azimuth pivot axis, and rotating the antenna about an elevational axis extending perpendicular to the azimuth axis. The step of rotating the antenna is illustratively performed while the antenna post is coupled to the second member, the second member is coupled to the first member, and the first member is coupled to the vehicle. Illustratively, the steps of rotating the antenna about the azimuth axis and rotating the antenna about the elevational axis are performed by an occupant supported in the passenger compartment.

In yet another illustrative embodiment of the present disclosure, a swivel mount apparatus for coupling an accessory to a vehicle includes a first member configured to couple to a mounting interface on a vehicle, a second member rotatably coupled to the first member, and a mounting post affixed to the first member and extending upwardly relative to the first member. The mounting post receives the second member, and defines an azimuth pivot axis extending perpendicular to the first member, and the second member being rotatable about the azimuth pivot axis relative to the first member. A first receiving wall and a second receiving wall are affixed to the second member such that a receiving space is formed between the first receiving wall and the second receiving wall. A retaining member is disposed above the second member and operably coupled to the mounting post. The retaining member is configured to secure the second member in a desired rotational position about the azimuth pivot axis. A coupler is configured to couple an accessory within the receiving space. A spacing member is illustratively received by the mounting post and is disposed between the first member and the second member. Illustratively, a first angle member defines the first receiving wall, and a second angle member defines the second receiving wall, wherein the second member includes a vertical wall, and the first angle member and the second angle member are affixed to the vertical wall of the second member. The second member illustratively supports the antenna for rotation about the azimuth pivot axis. Illustratively, the coupler includes at least one fastener received within at least one threaded hole in the second member, wherein the at least one fastener secures the accessory to the second member. The first member illustratively includes a thru-hole configured to receive a fastener, wherein the fastener secures the first member to a pre-existing coupling point defined by the mounting interface of the vehicle. Illustratively, the accessory comprises an antenna including an antenna post supported within the receiving space.

In a further illustrative embodiment of the present disclosure, a method of manufacturing a swivel mount antenna includes the steps of providing a vehicle, identifying on the vehicle a first mounting interface and a coupling point for an equipment item, and identifying form, fit and function of the equipment item. The method further includes the steps of supporting the equipment item to rotate 360 degrees in an azimuth direction at a lower section of a support member, and coupling the lower section of the support member to couple with the first mounting interface located on an opposing end of the support member from the equipment item. The step of identifying the mounting interface and the coupling point for the equipment item includes identifying at least one fastener to secure the equipment item to the first mounting interface configured to adjustably support and orient the equipment item relative to the first mounting interface on the vehicle. Illustratively, a quick disconnect member is configured to receive and releasably couple with the support member of the equipment item, wherein the support member is configured to position and support the equipment item. Further illustratively, the quick disconnect member includes a threaded member that is configured to provide a variable and repositionable coupling pressure against the support member, wherein the coupling pressure is sufficient to prevent the support member from decoupling from the quick disconnect member up to a predetermined force. The equipment item illustratively comprises an antenna, and the support member illustratively comprises an antenna post.

In yet another illustrative embodiment of the present disclosure, a method includes the steps of identifying and analyzing candidate mounting support surfaces on a mobile equipment item to determine a target mounting location, wherein the mobile equipment item includes a first mobile equipment section and a second mobile equipment section, the first mobile equipment section including an operator section and the second mobile equipment section including portions which are external to the operator section and which surround the operator section or extend away from the operator section. The target mounting location is within a first distance from an aperture in the second mobile equipment section, the target mounting location including a pre-existing coupling member that is accessible from outside the mobile equipment item without disassembly of the mobile equipment item and including a structure adapted to couple together at least two parts of the mobile equipment item. A retaining member rotationally secures an antenna for 360 degree rotation about an azimuth pivot axis, the retaining member being within a second distance from the aperture in the second mobile equipment section configured to enable at least one of an occupant and a robotic armature disposed within the control chamber to reposition the antenna. Illustratively, the method further includes providing an adapter member having a first section and a second section, wherein the first section is adapted to releasably couple with the coupler and the existing coupling member so as to avoid interference between the adapter member and the first and second mobile equipment sections. The retaining member illustratively comprises a threaded post extending upwardly from the first section, and a wing nut operably coupled to the threaded post and positioned above the second section. Illustratively, the method further includes providing for a dual use nature of the antenna, wherein the antenna may be mounted on a tripod separate from a vehicle and used on the ground as part of communications with a satellite. The mobile equipment item illustratively comprises a vehicle, the first mobile equipment section illustratively comprises a passenger compartment, and the second mobile equipment section illustratively comprises a hood. Further illustratively, the aperture comprises a passenger side window. Additionally, the at least two parts illustratively comprise the hood and a grille. Illustratively, the second distance is less than the first distance. The first distance is configured to enable at least one of an occupant and a robotic armature disposed within the control chamber to access the pre-existing coupling member and thereby couple and uncouple the equipment item to the target mounting location.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
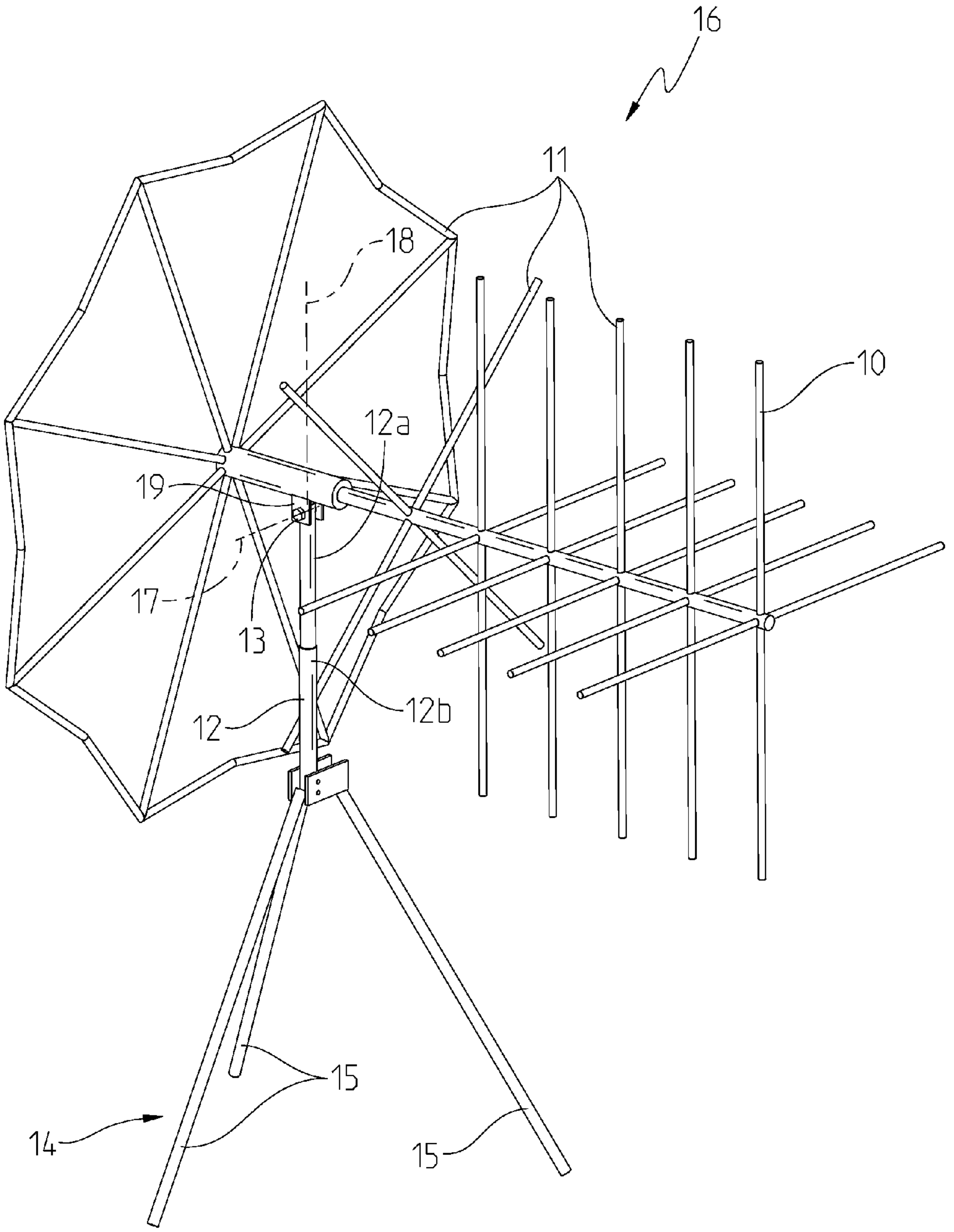
Fig. 1 (Prior Art)
FIG. 1 is a perspective view of a prior art SATCOM antenna mounted on a tripod.

FIG. 1 shows a prior art equipment item and, more particularly, a SATCOM antenna system 16 including an antenna 10 mounted on a tripod 14. It is known that the tripod 14 includes legs 15 that may be used to stabilize the antenna 10 on the ground, including uneven terrain. Antenna system 16 generally includes antenna post 12 mechanically coupled to antenna 10 and a pivot pin 13 defining a conventional elevational pivot point or axis 17.

Antenna 10 illustratively may be of conventional design as including two sections with several antenna elements or blades 11 configured to receive and/or transmit electromagnetic signals within a predetermined frequency range. More particularly, the antenna blades 11 are supported by the antenna post 12. The altitude or elevation of antenna 10 relative to a support (e.g., the ground or a mobile equipment item) may be adjusted by disengaging pivot pin 13, adjusting antenna 10 to a desired altitude, and re-engaging pivot pin 13. The pivot pin 13 may comprise a threaded bolt defining an elevational pivot axis 17 and received within a clevis 19. The altitude is adjusted by rotating the antenna 10 about pivot point or axis 17, wherein the pin 13 defines a friction lock. The antenna 10 may be adjusted in azimuth about an azimuth pivot axis 18 by moving the legs 15 of the tripod 14. In certain illustrative embodiments, the antennae post 12 may include an upper portion 12*a* telescopingly received within a lower portion 12*b* for axial (i.e., elevational) adjustment.

Antenna system 16 may be selected from a variety of commercially available SATCOM antenna systems such as AV 2055 UHF SATCOM Unidirectional Antenna manufactured by Ultralife Corporation of Newark, N.Y. The technical data sheet for the AV2055 UHF Satellite Communication (SATCOM) Antenna is expressly incorporated herein by reference.

It is desired to use antenna system 16 in a dual-use manner which further allows certain SATCOM antenna systems to retain their ground use capability while also allowing these SATCOM antenna systems to be mounted onto a mobile equipment item, such as a vehicle 20, when the need arises for mobile operations. Exemplary vehicles may include various commercial motor vehicles (CMVs), such as telecommunication vehicles used to facilitate multimedia broadcasting, or any other commercial or privately owned vehicle having a permanent or removable externally mounted antenna system. Exemplary vehicles may further include government motor vehicles (GMVs), which further include humvees used in support of domestic or foreign deployed military operations.

Figure 2:
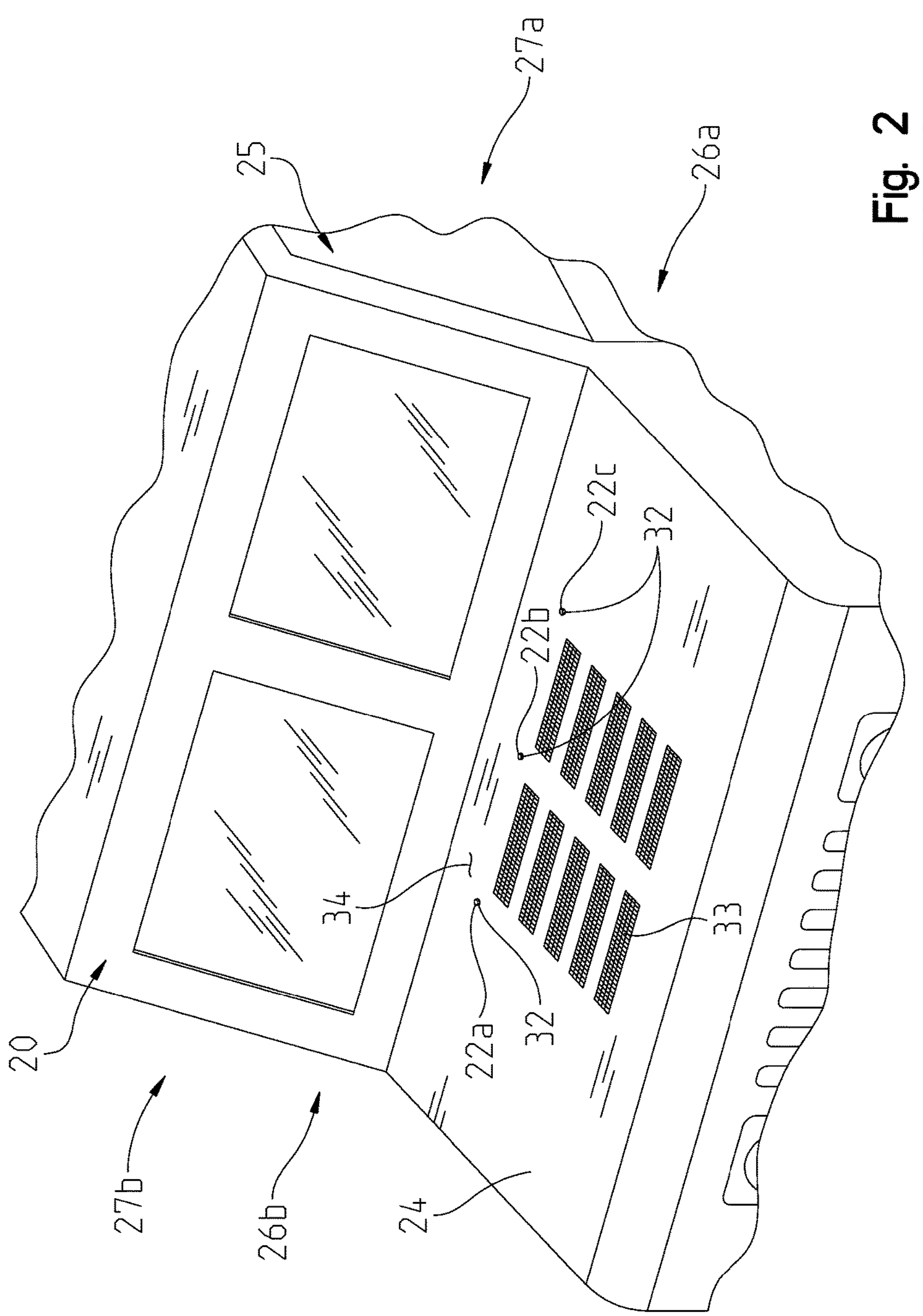
Fig. 2 (Prior Art)
FIG. 2 is a partial perspective view of a prior art vehicle, showing illustrative mounting points located on the hood or bonnet of the vehicle.
Figure 5:
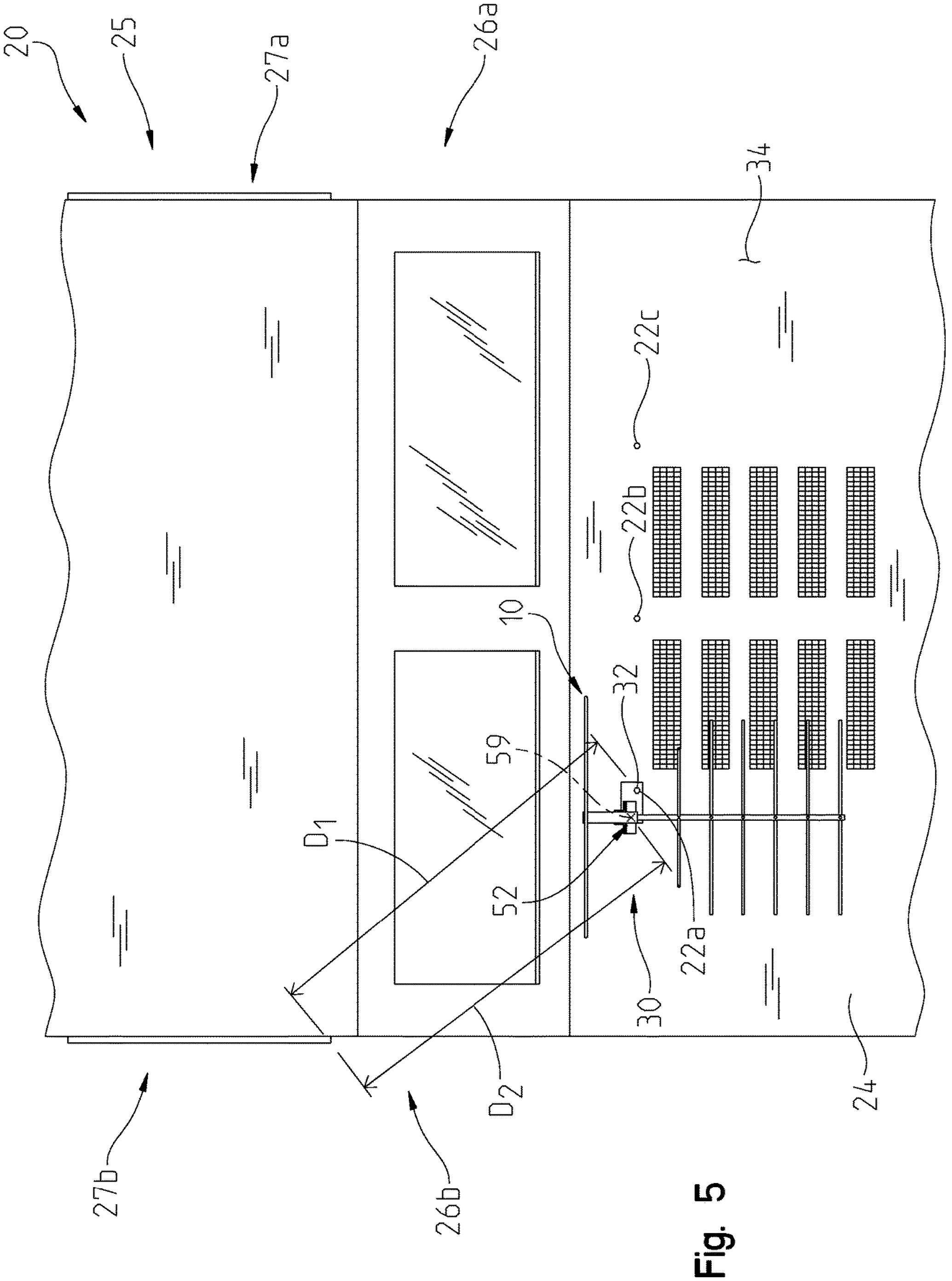
FIG. 5 is a top plan view, in partial schematic, of the illustrative mounting system of FIG. 3.

FIG. 2 is a perspective view of an illustrative front portion of vehicle 20 which includes one or more exemplary mounting interfaces or locations, such as candidate mounting locations or support surfaces 22*a*, 22*b*, 22*c*. Vehicle 20 illustratively includes a first mobile equipment section or passenger compartment 25 extending between a driver side 26*a* and a passenger side 26*b*. A second mobile equipment section, illustratively a hood or bonnet 24 is mechanically coupled to vehicle 20 and illustratively includes mounting locations 22*a*, 22*b*, 22*c* having internally threaded coupling points 28 which are integral with hood 24 (FIG. 5). Threaded coupling point 28 may be a machined or drilled hole of a predetermined depth including internal threads and sufficient to receive an externally threaded fastener so that an item, such as a mounting member, may be affixed to hood 24. In other words, a fastener including external threads may be in threaded connection with the internally threaded coupling point 28.

In various embodiments according to the present disclosure, the mounting locations 22 allow for installation and mounting of antenna system 16 onto vehicle 20. Exemplary antenna systems include, for example, UHF SATCOM Antenna systems typically used in civilian communications activities and/or deployed military operations. Exemplary antenna systems may further include antennas used to receive and transmit signals to facilitate broadcasting of various multimedia content such as news, weather and sports. In an alternate embodiment of the present disclosure, vehicle 20 may further include a plurality of mounting locations 22 on areas of vehicle 20 other than hood 24. These other mounting locations 22 may further include threaded coupling points 28 which are also integral with these various other locations of vehicle 20. Exemplary locations other than hood 24 include, for example, a roof of vehicle 20, side panels of vehicle 20, and/or other areas of vehicle 20 suitable for external mounting of antenna system 16. Mounting location 22 including threaded coupling point 28 may be of pre-existing nature such that the mounting locations and coupling points are features provided to vehicle 20 during the initial manufacturing and assembly of vehicle 20. By utilizing pre-existing mounting locations and coupling points on the vehicle 20, no permanent vehicle alterations or modifications (e.g., drilling of holes) are required.

Figure 3:
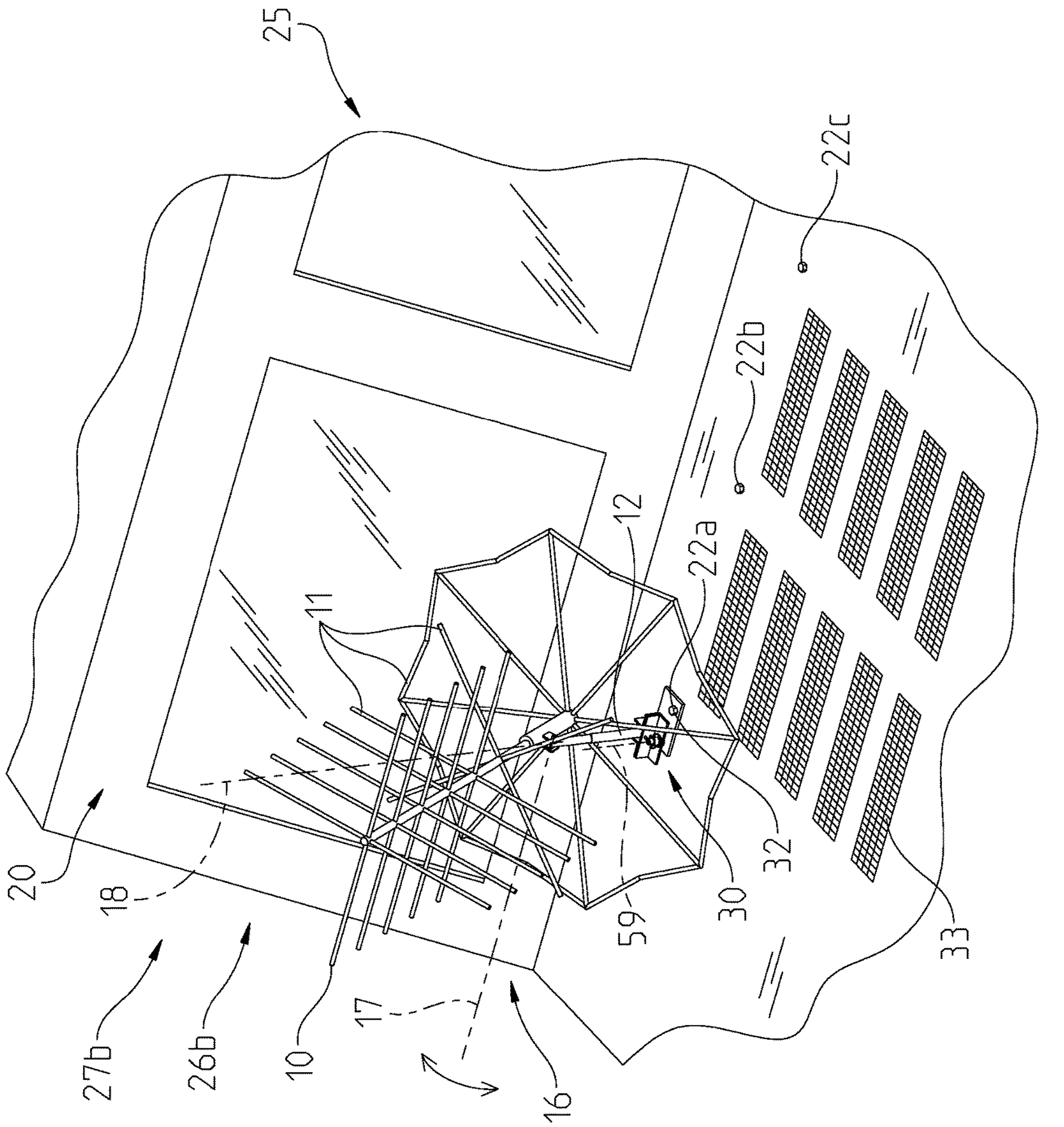
FIG. 3 is a partial perspective view similar to FIG. 2, showing an antenna system mounted on the hood of a vehicle by an illustrative mounting system of the present disclosure.

FIG. 3 is a front perspective view of an exemplary embodiment of the present disclosure wherein antenna system 16 is mounted on a top surface of hood 24 of vehicle 20. A swivel mount 30 enables the installation and mounting of antenna system 16 and is described in further detail in the illustrative embodiment of FIGS. 4 and 5. Swivel mount 30 illustratively includes fastener 32 which secures and mechanically couples swivel mount 30 to hood 24. Exemplary fasteners 32 include various externally threaded bolts having thread patterns and length sufficient to secure and properly couple swivel mount 30 to the one or more threaded coupling points 28 that are integral with hood 24. The fasteners 32 may be conventional bolts which form part of the original vehicle 20. In other words, fasteners 32, illustratively comprise pre-existing bolts adapted to couple together at least two parts of the vehicle 20. In certain illustrative embodiments, the fasteners 32 are conventional bolts configured to secure a screen or grille 33 to the hood 24.

As detailed above in connection with FIG. 1, antenna system 16 generally includes antenna post 12 mechanically coupled to antenna 10. In the disclosed embodiment of FIG. 3, antenna system 16 is mechanically coupled to swivel mount 30 via antenna post 12 and by one or more fasteners which are described in further detail in the disclosed embodiment of FIG. 6. Additionally, as indicated above in the description of FIG. 2, vehicle 20 includes a passenger compartment 25 which extends between a driver side 26*a* and a passenger side 26*b*, and hood 24 includes a plurality of mounting locations 22*a*, 22*b*, 22*c*. Apertures, illustratively entry/egress openings such as doors or windows 27*a* and 27*b*, are formed within the driver side 26*a* and the passenger side 26*b* of the passenger compartment 25. In the disclosed embodiment of FIG. 3, antenna system 16 is illustratively installed via mounting location 22*a* located in front of the passenger side 26*b* of vehicle 20. Stated another way, in the disclosed embodiment of FIG. 3, when seated facing the forward direction in the passenger compartment of vehicle 20, antenna system 16 is mounted via mounting location 22*a* that is farthest to the right. The forward direction is determined relative to the orientation of vehicle 20.

Figure 4A:
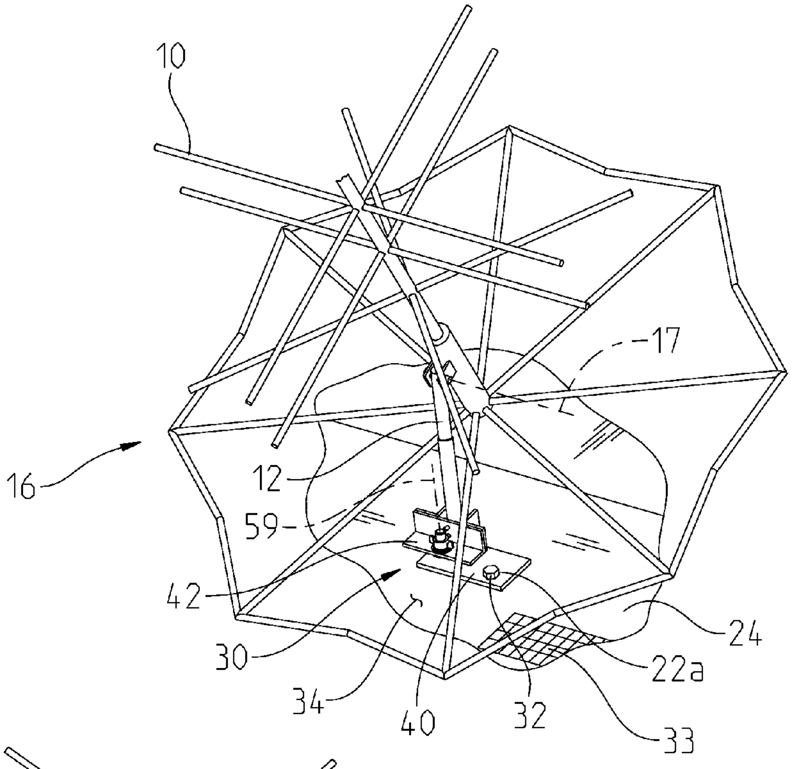
FIG. 4A is a detailed perspective view of FIG. 3, showing the antenna system in a first position.
Figure 4B:
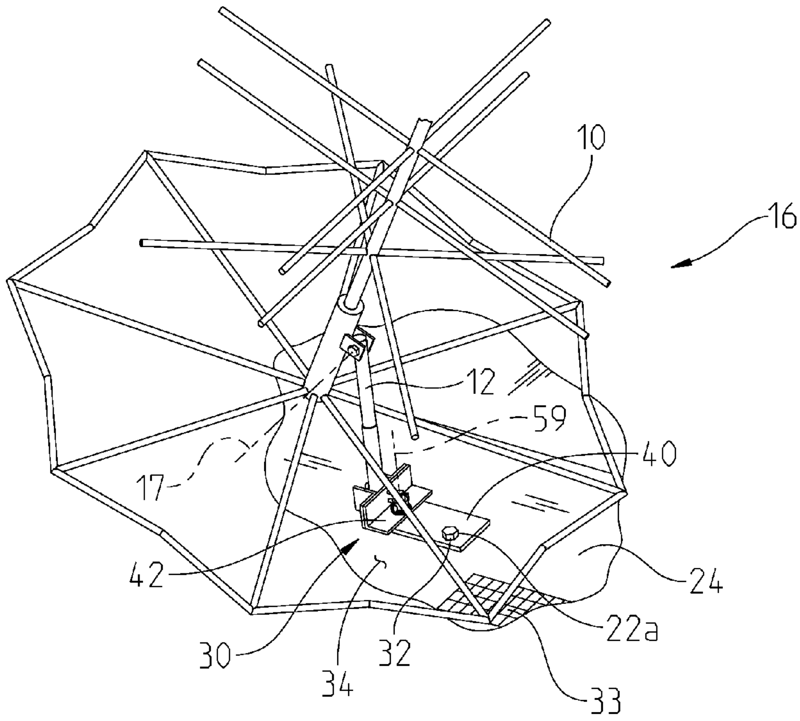
FIG. 4B is a detailed perspective view similar to FIG. 4A, showing the antenna system in a second position.

FIGS. 4A and 4B are detailed perspective views of an exemplary embodiment of the present disclosure wherein antenna system 16 is mounted on top of hood 24 of vehicle 20 at an upper interface surface 34. As indicated above in the description of FIG. 3, swivel mount 30 enables the installation and lower mounting of antenna system 16. Swivel mount 30 further includes a first member or base 40 and a second member or upper support 42. As shown in the illustrative embodiment of FIG. 5, first member 40 comprises a plate 44 having a length of 3¾ inches and a width of 2 inches. Illustratively, second member 42 includes an angle member 46 having a length of 3 inches, a width of 1 inch, and a height of 1 inch.

First member 40 is configured to receive fastener 32 which mechanically couples first member 40 to hood 24 via fastener 32 being in threaded connection with coupling point 28. Second member 42 is rotatably coupled to first member 40 and is retained in place via one or more retaining members 52, which are described in further detail in the illustrative embodiment of FIGS. 6 and 7. Second member 42 includes a first angle member 54 and a second angle member 56 coupled to angle member 46, illustratively through welds 55. A receiving space 57 is defined between a first receiving wall 54*a* of the first angle member 54 and a second receiving wall 56*a* of the second angle member 56. Illustratively, receiving space 57 receives antenna post 12 of antenna system 16, and antenna post 12 is mechanically coupled to second member 42 via one or more fasteners 58. As indicated above, second member 42 is rotatably coupled to first member 40 thereby defining an azimuth pivot axis 59 that extends in a vertical direction perpendicular to first member 40. First member and second member may be manufactured from a variety of different materials such as aluminum, cast iron or steel.

When antenna system 16 is mounted on top of hood 24, second member 42 causes antenna system 16 to be manually rotatable about azimuth pivot axis 59, wherein the degree of rotation is between 0 degrees and 360 degrees. Swivel mount 30, and in particular second member 42, further enables antenna system 16 to be manually rotatable by an operator or occupant residing inside the passenger compartment 25 of vehicle 20. Because antenna system 16 is manually rotatable, the driver of vehicle 20 is not required to rotate or maneuver vehicle 20 in order to orient or direct antenna system 16 to a particular desired location. For example, in one illustrative embodiment of the present disclosure, antenna system 16 may be manually rotated, via second member 42, and directed to a certain area of the sky in order to acquire a communications link with a particular orbiting satellite. In another illustrative embodiment, antenna system 16 may be manually rotated, via second member 42, and oriented in a particular direction to establish a communications link with various ground based telecommunications facilities including radio stations, news stations or any other facility transmitting or receiving information via electro-magnetic signals. In yet another illustrative embodiment, antenna system 16 may be manually rotated, via second member 42, and oriented in a particular direction to establish a communications link with various commercial, private, or military aircraft.

According to this exemplary embodiment, in addition to being rotated about azimuth pivot axis 59, antenna 10 may also be rotated about elevational pivot axis 17 to achieve a desired elevation or altitude relative to hood 24 or another location of vehicle 20. The rotational and altitudinal adjustment assists antenna 10 acquire a reciprocal SATCOM link via line of sight communication with a particular orbiting satellite. In one aspect of this embodiment, the altitude or elevation of antenna 10 relative to vehicle 20 is adjusted via a pivot pin 13 defining the elevational pivot axis 17. As detailed above, the altitude is adjusted about pivot pin 13, which may further include a conventional friction lock.

With reference to FIG. 5, the target mounting location 22*a* and associated coupling point 28 is illustratively within a first distance (D1) from the passenger side window 27*b*. The distance D1 is configured to enable an occupant (or a robotic armature) disposed within the passenger compartment 25, illustratively seated, to access the mounting fastener 32 at mounting location 22*a* from the passenger side window 27*b*. The target mounting location 22*a* includes existing coupling point 28 and cooperating coupling member 32 that is accessible from outside the vehicle 20 without disassembly of the antenna 10. The target mounting location 22*a* includes a structure adapted to couple at least two parts of the vehicle together. Illustratively, the at least two parts includes grille 33 and hood 24 coupled together with fastener 32.

With further reference to FIG. 5, the retaining member 52 is illustratively within a second distance (D2) from the passenger side window 27*b* for other entry/egress openings, such as an open door). In one illustrative embodiment, the distance D2 is configured to enable an occupant (or a robotic armature) disposed within the passenger compartment 25, illustratively seated, to reposition the antenna 10 from the passenger side window 27*b*. More particularly, from the passenger side window 27*b* the occupant can reach the retaining member 52 to tighten and/or loosen the wing nut 72 to rotationally reposition the antenna about the azimuth pivot axis 59. Illustratively, distance D2 is less than distance D1, wherein both distances D1 and D2 are less than the arm length of an average adult (e.g., about 25 inches).

Figure 6:
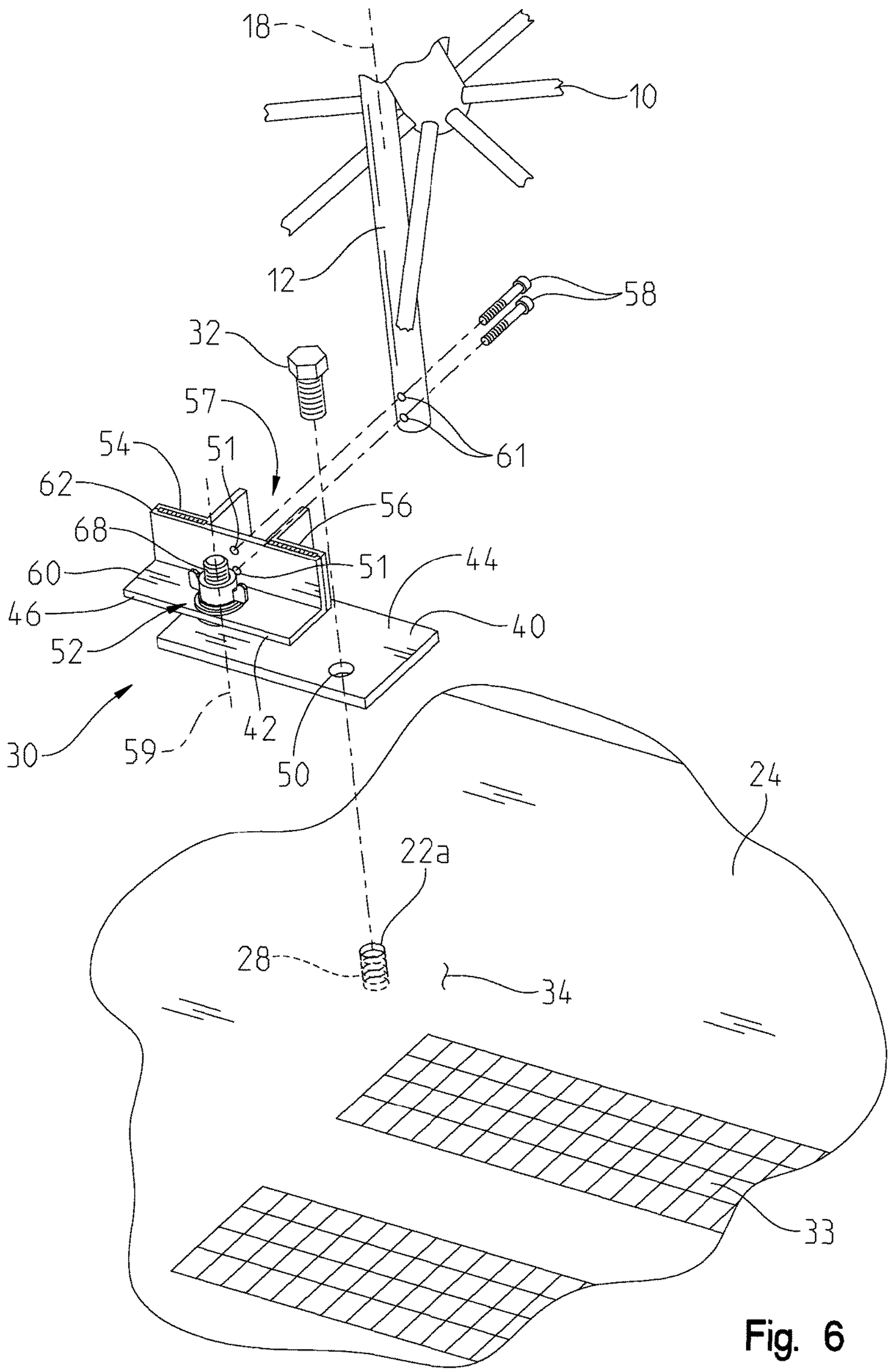
FIG. 6 is an exploded perspective view of the illustrative mounting system of FIG. 3, including a swivel mount, a mounting point, and an antenna post.

FIG. 6 is an exploded perspective view of an exemplary swivel mount 30, including threaded coupling point 28, one or more fasteners 32, and antenna post 12. In the illustrative embodiment of FIG. 6, first member 40 is further defined as including an opening, such as thru-hole 50 which receives fastener 32. Fastener 32 enables first member 40 to be affixed and mechanically coupled to hood 24. As indicated above in the description of FIG. 2, threaded coupling point 28 may be a machined or drilled hole of a predetermined depth sufficient to receive the threads of fastener 32 such that first member 40 may be affixed to hood 24 via fastener 32 being in threaded connection with coupling point 28. Moreover, as indicated above, second member 42 is rotatably coupled to first member 40 and is retained in place via one or more retaining members 52. The retaining member 52 provides quick connect and disconnect functionality with regard to assembly of swivel mount 30.

With further reference to FIG. 6, second member 42 further illustratively includes first angle member 54 and second angle member 56 wherein a receiving space 57 is defined between first receiving wall 54*a* of first angle member 54 and second receiving wall 56*a* of second angle member 56. Receiving space 57 receives antenna post 12 of antenna system 16 and antenna post 12 is mechanically coupled to second member 42 via one or more fasteners 58. Antenna post 12 may include one or more holes 61 which may be drilled or machined such that the holes 61 create openings through antenna post 12. As may be appreciated, the angle members 54 and 56 assist in securing the antenna post 12 against forces in multiple axes. For example, the receiving walls 54*a* and 56*a* help prevent rotation of the antenna post 12 about an axis extending parallel to fasteners 58 (i.e. perpendicular to the longitudinal axis of the antenna post 12 and parallel to the receiving walls 54*a* and 56*a*). The receiving walls 54*a* and 56*a* also help prevent translational movement of the antenna post 12 in a direction perpendicular to the walls 54*a* and 56*a*.

In the illustrative embodiment of FIG. 6, antenna post 12 includes a cylindrical wall having a pair of holes 61 receiving fasteners 58. Second member 42 may be further described as a third angle member 46 including a horizontal section 60 and a vertical section 62, wherein first angle member 54 is in welded connection with a first portion of vertical section 62 and second angle member 56 is in welded connection with a second portion of vertical section 62. Second member 42 further includes one or more threaded holes 51 wherein each threaded hole receives a single fastener 58. The depth of threaded hole 51 is equal to the thickness of vertical section 62. To affix antenna post 12 to second member 42 a single fastener 58 is inserted through each of the two holes 61 of antenna post 12. The fastener 58 is then screwed into threaded hole 51 of second member 42 so that the threads of fastener 58 fully engage the threads of threaded hole 51, thereby mechanically coupling antenna post 12 to second member 42 via at least one fastener 58 being in threaded connection with at least one threaded hole 51.

Figure 7:
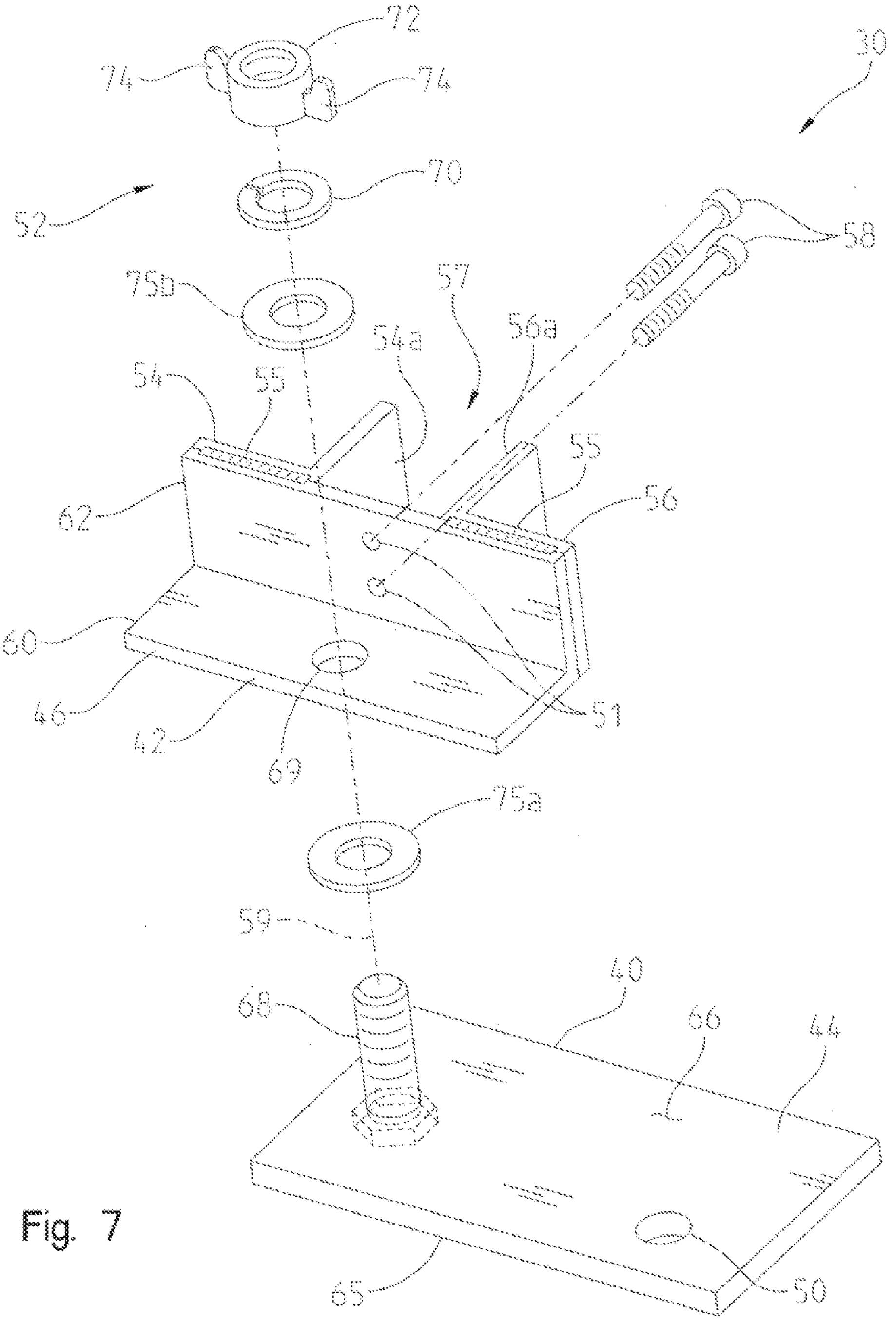
FIG. 7 is an exploded perspective view of the illustrative swivel mount of FIG. 6.

FIG. 7 is an exploded perspective view of an exemplary swivel mount 30 according to the present disclosure. First member 40 illustratively includes a first or lower surface 65, a second or upper surface 66 and a mounting post 68, wherein mounting post 68 is inserted from first surface 65 and extends upwardly relative to second surface 66. Mounting post 68 may be a threaded bolt and may be affixed to first member 40 via a welded connection. As indicated above in the description of FIGS. 4A and 4B, second member 42 is rotatably coupled to first member 40 and is retained in place via at least one retaining member 52. Second member 42 further includes hole 50 which receives mounting post 68. With regard to first member 40, in one illustrative embodiment of the present disclosure, the distance from the center of mounting post 68 and the center of hole 50 is at least 3¼ inch.

In the illustrative embodiment of FIG. 6, retaining member 52 includes a lock washer 70, and a wing nut 72 including tabs 74 to facilitate rotation by a user. Retaining member 52 ensures that second member 42 remains in rotatable connection with first member 40 via mounting post 68. Additionally, wing nut 72 is configured to be in threaded connection with mounting post 68. Wing nut 72 may be rotated clockwise to lock second member 42 into a desired position to produce a force sufficient for precluding rotation of second member 42 relative to first member 40. When wing nut 72 is fully tightened such that second member 42 is locked into a desired position, lock washer 70, positioned under wing nut 72, helps to ensure wing nut 72 does not loosen from vibrations caused by vehicle 20. Once tightened, wing nut 72 may also be rotated counterclockwise to loosen and enable rotation of second member 42 relative to first member 40.

Swivel mount 30 may further include one or more washers 75, wherein one washer 75*a* receives mounting post 68 and is positioned between first member 40 and second member 42, and another washer 75*b* also receives mounting post 68 and is positioned between second member 42 and lock washer 70. As indicated above in the description of FIG. 5, second member 42 includes a first angle member 54 and a second angle member 56 wherein a receiving space 57 is defined between first angle member 54 and second angle member 56. Receiving space 57 receives antenna post 12 (FIG. 6) and antenna post 12 is mechanically coupled to second member 42 via one or more fasteners 58. In one illustrative embodiment of the present disclosure, receiving space 57 has a width of 1 inch and a depth of 1 inch. Second member 42 further includes one or more threaded holes 51 wherein each threaded hole receives a single fastener 58. To assemble swivel mount 30, mounting post 68 receives a first washer 75*a*, then second member 42 is received by mounting post 68 via hole 50 so that second member 42 is positioned atop first member 40. Mounting post 68 then receives a second washer 75*b* as well as lock washer 70 and wing nut 72. Each threaded hole 51 receives a single fastener 58.

Figure 8:
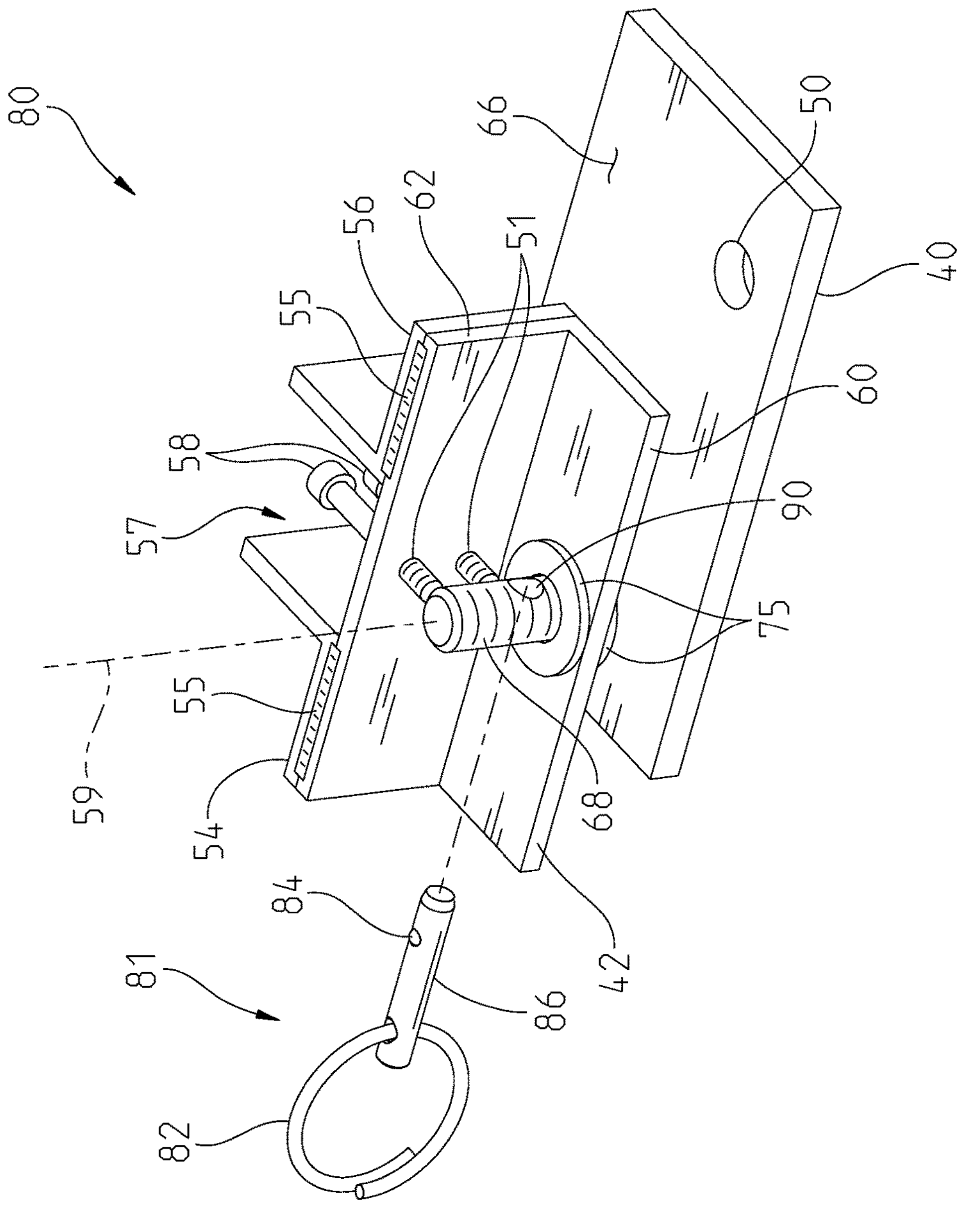
FIG. 8 is a partially exploded perspective view of another illustrative embodiment swivel mount according to the present disclosure.

In alternate illustrative embodiments of the swivel mount 30, retaining member 52 may include a variety of retaining devices other than lock washer 70 and wing nut 72. FIG. 8 is an illustration of another illustrative embodiment of a swivel mount 80 according to the present disclosure. For example, in swivel mount 80, the retaining device is detent pin 81 which also enables second member 42 to be rotatably coupled to mounting post 68. Detent pin 81 includes ring 82, ball lock 84 and pin 86. Swivel mount 80 includes substantially the same components as swivel mount 30 except that in the disclosed embodiment of FIG. 8, lock washer 70 and wing nut 72 are replaced by detent pin 81. Additionally, mounting post 68 includes a hole 50 for receiving pin 86 of detent pin 81. Detent pin 81 may be grasped by ring 82 and quickly inserted into hole 50 of mounting post 68. Ball lock 84 helps to lock pin 86 in hole 50 and retain second member 42 in a desired orientation relative to first member 40. Thus detent pin 81 provides an additional quick connect and disconnect functionality with regard to assembly of swivel mount 80.

An illustrative method of manufacturing, installing and/or coupling antenna 10 to a vehicle 20 includes the steps of identifying and analyzing candidate mounting support surfaces on vehicle 20 to determine a target mounting location 22*a*. Next, the installer identifies the form, fit and function of the antenna 10 relative to the target mounting location 22*a*. As further detailed herein, the target mounting location 22*a* is within a first distance (D1) from the passenger side window 27*b*. The fastener 32 is inserted through the thru-hole 50 in the first member 40 and threaded into the opening 28.

First washer 75*a* is received over the mounting post 68, and an opening 69 in the second member 42 receives the mounting post 68. The second washer 75*b* is received over the mounting post 68 above the second member 42. The lock washer 70 is received over the mounting post 68, and the wing nut 72 threadably coupled to the mounting post 68. The retaining member 52 provides a quick connect and disconnect structure that provides a first force as applied by the user to prevent decoupling of the second member 42 (and antenna 10) from the first member 40. The retaining member 52 rotationally secures the antenna 10 for 360 degree rotation about azimuth pivot axis 59. The wing nut 72 is positioned within a second distance (D2) from the passenger side window 27*b* defined such that an occupant and a robotic armature disposed within the passenger compartment 25 may engage and reposition the antenna 10.

Illustratively, the first member 40 is adapted to releasably couple with the retaining member 52 and the existing fastener 32 so as to avoid interference between the mount 30 and sections of the vehicle 20 (i.e., the hood 24 and the passenger compartment 25). In operation, an occupant supported within the passenger compartment 25 can reach, from the passenger side window 27*b*, the wing nut 72 to unlock the second member 42 for rotation about the azimuth pivot axis 59 within a range of 360 degrees. Similarly, the occupant supported within the passenger compartment 25, from the passenger side window 27*b*, can reach the pivot pin 13 to unlock the antenna 10 for rotation about the elevational pivot axis 17. The method further includes providing for a dual use nature of the antenna 10, wherein the antenna 10 may be mounted on the tripod 14 separate from the vehicle 20 and also supported by swivel mount 30 on the vehicle 20, both as part of communications with a satellite.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure. The benefits, advantages, solutions to problems, and any element(s) that may cause any benefit, advantage, or solution to occur or become more pronounced are not to be construed as critical, required, or essential features or elements of any or all the claims. The disclosure is defined solely by the appended claims including any amendments made during the pendency of this application and all equivalents of those claims as issued.

The invention claimed is:

1. A swivel mount apparatus for coupling an antenna to a vehicle, the swivel mount apparatus comprising:

a first member configured to couple to a mounting interface on the vehicle;

a second member rotatably coupled to the first member;

a mounting post affixed to the first member and extending upwardly relative to the first member wherein the mounting post receives the second member and causes the second member to be rotatably coupled to the first member, the mounting post defining an azimuth pivot axis extending perpendicular to the first member;

the antenna including an antenna post and antenna blades supported by the antenna post for pivoting movement about an elevational pivot axis extending perpendicular to the azimuth pivot axis; and a coupler coupling the antenna post to the second member;

wherein the second member includes a first receiving wall and a second receiving wall; and a receiving space is defined by the first receiving wall and the second receiving wall, the antenna post is received within the receiving space, wherein the first receiving wall and the second receiving wall are configured to prevent rotation of the antenna post about an axis extending perpendicular to a longitudinal axis of the antenna post and parallel to the first receiving wall and the second receiving wall, and are configured to prevent translational movement in a direction perpendicular to the first receiving wall and the second receiving wall.

2. The swivel mount apparatus of claim 1, further including a first angle member defining the first receiving wall and a second angle member defining the second receiving wall, wherein the second member includes a vertical wall, and the first angle member and the second angle member are affixed to the vertical wall of the second member.

3. The swivel mount apparatus of claim 1, wherein the second member supports the antenna for rotation about the azimuth pivot axis.

4. The swivel mount apparatus of claim 1, wherein the coupler includes at least one fastener received within at least one threaded hole in the second member, wherein the at least one fastener secures the antenna post to the second member.

5. The swivel mount apparatus of claim 1, wherein the first member includes a lower surface and an upper surface, and the mounting post is inserted from the lower surface and extends upwardly relative to the upper surface.

6. The swivel mount apparatus of claim 1, wherein the first member includes a thru-hole configured to receive a fastener, wherein the fastener secures the first member to a pre-existing coupling point defined by the mounting interface of the vehicle.

7. The swivel mount apparatus of claim 1, further including a first washer and a second washer, wherein the first washer receives the mounting post and is disposed between the first member and the second member, and the second washer receives the mounting post and is disposed atop the second member.

8. The swivel mount apparatus of claim 7, further including a lock washer disposed atop the second washer and a wing nut disposed atop the lock washer, wherein the lock washer and the wing nut secure the second member in a desired rotational position about the azimuth axis.

9. A method of installing a swivel mount apparatus on a vehicle, the method comprising the steps of:

locating a pre-existing mounting interface on a vehicle, the mounting interface including a coupling point configured to secure a first member to the vehicle;

mechanically coupling the first member to the coupling point of the mounting interface;

rotatably coupling a second member to the first member for rotation about an azimuth pivot axis;

a locking pin comprising a shaft, a ring passing through a first end of the shaft, and a locking ball structure disposed on a second end of the shaft that selectively extends away or inwardly with respect to an exterior surface of said shaft;

installing at least one retaining member into a coupling structure coupled to the first member and rotatably passing through the second member, wherein said at least one retaining member further is formed with a locking pin aperture passing through said at least one retaining member, said locking pin is removably inserted into said locking pin aperture to retain the second member in an orientation with respect to said first member;

coupling an antenna post of an antenna to the second member;

wherein the second member includes a first receiving wall, a second receiving wall, and a receiving space defined between the first receiving wall and the second receiving wall, the antenna post being received within the receiving space.

10. The method of claim 9, further including the steps of installing a first washer between the first member and the second member, and installing a second washer atop the second member.

11. The method of claim 10, wherein the step of installing at least one retaining member atop the second member includes installing a lock washer atop the second washer, and installing a wing nut atop the lock washer.

12. The method of claim 9, wherein the vehicle includes a hood and a passenger compartment including a driver side and a passenger side, wherein the mounting interface is integral to the hood and is located longitudinally forward of the passenger compartment and laterally on the passenger side.

13. The method of claim 12, further including rotating the antenna about the azimuth axis, and rotating the antenna about an elevational axis extending perpendicular to the azimuth axis.

14. The method of claim 13, wherein rotating the antenna is performed while the antenna post is coupled to the second member, the second member is coupled to the first member, and the first member is coupled to the vehicle.

15. The method of claim 13, wherein the steps of rotating the antenna about the azimuth axis, and rotating the antenna about the elevational axis are performed by an occupant supported within the passenger compartment.

16. A swivel mount apparatus for coupling an accessory to a vehicle, the swivel mount apparatus comprising:

a first member configured to couple to a mounting interface on a vehicle;

a second member rotatably coupled to the first member;

a mounting post affixed to the first member and extending upwardly relative to the first member, wherein the mounting post receives the second member, the mounting post defining an azimuth pivot axis extending perpendicular to the first member, and the second member being rotatable about the azimuth pivot axis relative to the first member;

a first receiving wall and a second receiving wall affixed to the second member such that a receiving space is formed between the first receiving wall and the second receiving wall;

a retaining member disposed atop the second member and operably coupled to the mounting post, the retaining member configured to secure the second member in a desired rotational position about the azimuth axis;

a coupler configured to couple an antenna post within the receiving space; and a first angle member defining the first receiving wall and a second angle member defining the second receiving wall, wherein the second member includes a vertical wall, and the first angle member and the second angle member are affixed to the vertical wall of the second member;

wherein the first receiving wall and the second receiving wall are configured to prevent rotation of the antenna post about an axis extending perpendicular to a longitudinal axis of the antenna post, and are configured to prevent translational movement in a direction perpendicular to the first receiving wall and the second receiving wall.

17. The swivel mount apparatus of claim 16, further comprising a spacing member received by the mounting post and disposed between the first member and the second member.

18. The swivel mount apparatus of claim 16, wherein the second member supports the antenna for rotation about the azimuth pivot axis.

19. The swivel mount apparatus of claim 16, wherein the coupler includes at least one fastener received within at least one threaded hole in the second member, wherein the at least one fastener secures the accessory to the second member.

20. The swivel mount apparatus of claim 16, wherein the first member includes a thru-hole configured to receive a fastener, wherein the fastener secures the first member to a pre-existing coupling point defined by the mounting interface of the vehicle.

21. The swivel mount apparatus of claim 16, wherein the accessory comprises an antenna including an antenna post supported within the receiving space.

22. A method of manufacturing a swivel mount antenna comprising the steps of:

providing a vehicle comprising a first mounting interface and a coupling point for an equipment item, wherein the equipment item has a form, fit, and at least one function;

supporting the equipment item to rotate 360 degrees in an azimuth direction at a lower section of a support member; and coupling the lower section of the support member with the first mounting interface located on an opposing end of the support member from the equipment item;

wherein the first mounting interface and the coupling point for the equipment item comprises at least one pre-existing fastener or receiving structure for at least a portion of the fastener to secure the equipment item to the first mounting interface configured to adjustably support and orient the equipment item relative to the first mounting interface on the vehicle;

wherein the equipment item comprises an antenna, and the support member comprises an antenna post.

23. The method of claim 22, further including providing a quick disconnect member configured to receive and releasably couple with the support member of the equipment item wherein the support member is configured to position and support the equipment item, and the quick disconnect member includes a threaded member that is configured to provide a variable and repositionable coupling pressure against the support member, wherein the coupling pressure is sufficient to prevent the support member from decoupling from the quick disconnect member up to a predetermined force.

24. A method of mounting an equipment item on a mobile equipment item comprising the steps of:

providing a mobile equipment item comprising one or more candidate mounting support surfaces on the mobile equipment item to determine a target mounting location;

wherein the mobile equipment item includes a first mobile equipment section and a second mobile equipment section, wherein the first mobile equipment section includes an operator section and the second mobile equipment section includes portions which are external to the operator section and areas which surround the operator section or extend away from the operator section;

wherein the target mounting location is within a first distance from an aperture in the second mobile equipment section, wherein the target mounting location includes an existing coupling member that is accessible from outside the mobile equipment item without disassembly of the mobile equipment item comprising a structure adapted to couple at least two parts of the mobile equipment item together; and wherein a retaining member rotationally secures an antenna about an azimuth pivot axis, wherein the retaining member is within a second distance from the aperture in the second mobile equipment section configured to enable at least one of an occupant and a robotic armature disposed within the control chamber to reposition the antenna;

wherein the retaining member comprises a post extending upwardly from the first section that passes through a coupling aperture in said second member and a removable pin comprising a shaft, a ring passing through a first end of the shaft, and a locking ball structure disposed on a second end of the shaft that selectively extends away or inwardly with respect to an exterior surface of said shaft, wherein said post further comprises a locking pin aperture passing through said post, said locking pin is removably inserted into said locking pin aperture to retain the second member in an orientation with respect to said first member.

25. The method of claim 24, further including providing an adapter member having a first section and a second section, wherein the first section is adapted to releasably couple with the retaining member and the existing coupling member so as to avoid interference between the adapter member and the first and second mobile equipment sections.

26. The method of claim 24, further includes providing for a dual use nature of the antenna, wherein the antenna may be mounted on a tripod separate from a vehicle and used on the ground as part of communications with a satellite.

27. The method of claim 24, wherein the mobile equipment item comprises a vehicle, the first mobile equipment section comprises a passenger compartment, and the second mobile equipment section comprises a hood.

28. The method of claim 27, wherein the aperture comprises a passenger side window.

29. The method of claim 28, wherein the at least two parts comprises the hood and a grille.

30. The swivel mount apparatus of claim 2, further comprising a retaining member coupled with the mounting post that retains the first and second members in fixed orientation to each other.

31. The swivel mount as in claim 9, wherein said retaining member further comprises a removable pin comprising a ball lock structure that passes through and retains said second member in an orientation with respect to the first member.

* * * * *